JOSEPH PARADIS.

Improvement in Apparatus for Cleaning Railway-Tracks.

No. 5,162. Reissued Nov. 26, 1872.

Witnesses

Chas. H. Smith,

Geo. T. Pinckney

Joseph Paradis,

Lemuel W. Serrell

UNITED STATES PATENT OFFICE.

JOSEPH PARADIS, OF BROOKLYN, NEW YORK, ASSIGNOR TO HIMSELF, WILLIAM H. DREW, AND SARAH PARKER.

IMPROVEMENT IN APPARATUS FOR CLEANING RAILROAD TRACKS.

Specification forming part of Letters Patent No. 127,361, dated May 28, 1872; antedated May 14, 1872; reissue No. 5,162, dated November 26, 1872.

*To all whom it may concern:*

Be it known that I, JOSEPH PARADIS, of Brooklyn, in the county of Kings and State of New York, have invented an Improvement in Apparatus for Cleaning Railroad Tracks; and the following is declared to be a correct description of the same.

Heretofore revolving brushes have been used to clear street-railroad tracks of snow and ice, the same being hung so that the front brush cleaned one rail and the rear brush the other rail; but it has required a large expenditure of power to work these track-clearers, and the necessary speed of the brushes was generally obtained by several gear-wheels that caused great loss of power by friction.

My invention consists of a revolving brush-blower in a segmental case, hung diagonally under the truck of the car and revolved by the direct action of gear or friction wheels, so as to create a strong current of air to aid in the operation of clearing the track. A plow, made in the form of a compound curved chute, is applied to lift and throw outwardly any accumulation, such as snow or ice; and this is placed upon a vertical bar or support, so that it can be raised or lowered.

Figure 2:
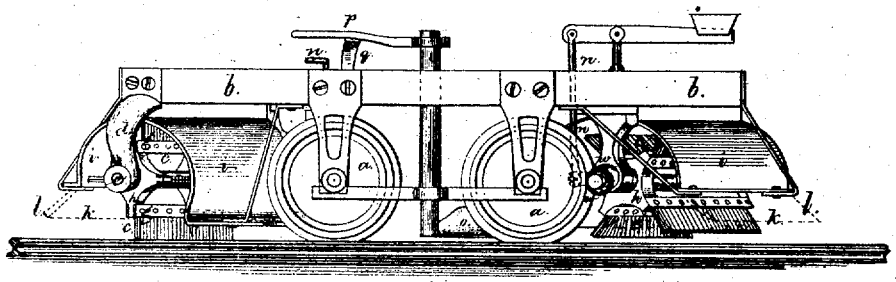
Figure 1:
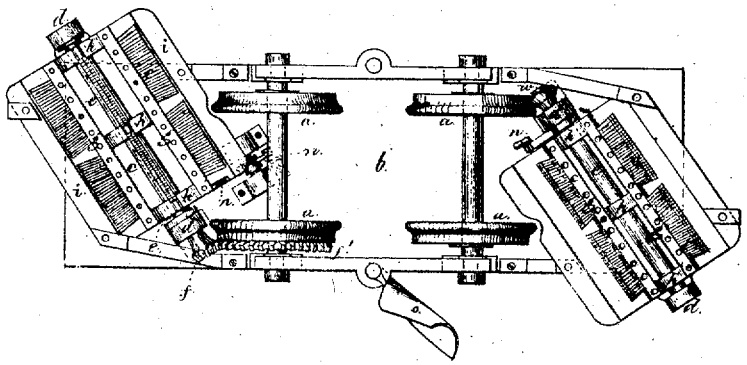

In the drawing, Figure 1 is an inverted plan, and Fig. 2 a side elevation, of my apparatus.

*a a* are the running-wheels of a street car or truck, and *b* the truck-frame. The revolving brush *c* on the shaft *e* is hung in bearings *d* on a line diagonal to the track, and this brush extends the whole width of the track. The shaft *e* carries near its end the pinion *f* that gears into the miter-wheel *f'* upon the wheel *a*, and thereby the brush *c* is revolved with great speed when the car is in motion. The teeth or wheel *f'* may be upon the inner or outer face of the wheel *a*, and the lever and handle *n* are employed to rotate an eccentric box in the bearings *d* and throw the gear *f* in or out of contact with *f'*, so as to stop the brush or cause its revolution. I prefer to use two brushes, one in front of the wheels and the other behind the same, the parts being duplicated, as shown. The revolving brush *c* is made with plates *g* attached to the heads *h* upon the shaft *e*, and from the plates *g* the pieces of cane, rattan, or similar material project; and these can be easily replaced when worn out. The segmental case *i* surrounds the brush *c*, except upon the under side, so that the revolution of the brush in the case creates a strong current of air beneath the edge of the case through the opening *k*, and this current will be strong enough to remove most of the snow or dust upon the track, so that the brush has very little to remove; and where two brushes are used the opening *k* is made wider at the forward end, so that that brush removes the upper part of the snow and the rear brush finishes the work. The boards *l* (see dotted lines) may be hinged at the edge of case *i* near the opening *k* to direct the material as it is thrown off from the track. Instead of the pinion *f* and gear-wheel *f'*, the brushes can be revolved by conical friction-wheels kept in contact with the faces of the wheels *a*, as shown at *w*. The adjustable plow *o* is provided at the side of the truck to throw the drifts of snow further from the track; and one of these may be upon each side of the truck, so that the apparatus will be equally efficient if moving in either direction. The plow *o* is made in the form of a compound curved and inclined plate to pass beneath and lift the material and then throw the same outwardly over the snow or ice at the side, and thereby lessen the resistance usually experienced with a scraper that simply pushes the material aside by a diagonal action. This plow *o* is mounted upon a vertical shaft, and can be raised or lowered and the shaft turned by the lever *p*, so as to place the plow at whatever position or angle it may work to the best advantage upon the material to be removed. The pawl or holder *q* serves to retain the lever at the position where it may be placed.

I do not claim two separate brushes placed diagonally and revolved from the axle by gear-wheels thereon that are placed between the wheels, as these have been employed; but the brushes do not and cannot both extend across both tracks. By driving the brush by contact with the wheel itself, or a gear upon the outer side thereof, the brushes can extend entirely across both tracks; and the rapidity of the brush is increased in consequence of the enlarged size of the driving-wheel.

I claim as my invention—

1. The brushes *c* within the case *i*, revolved by a pinion that is in contact with the surface of the car-wheel or teeth thereon, as and for the purposes set forth.

2. The eccentric bearing for the shaft of the brushes, in combination with the pinion and actuating car-wheel, as and for the purposes set forth.

3. The compound curved and inclined plow *o* beneath the platform *b*, and mounted, substantially as set forth, so as to be adjustable, in combination with track cleaning or sweeping mechanism, substantially as specified.

Signed by me this 3d day of August, A. D. 1872.

JOSEPH PARADIS.

Witnesses:
GEO. T. PINCKNEY,
CHAS. H. SMITH.